United States Patent [19]
Otsap

[11] 3,848,584
[45] Nov. 19, 1974

[54] INTEGRATED FLOW INDICATOR

[75] Inventor: Ben Amy Otsap, Encino, Calif.

[73] Assignee: Meeda Scientific Instrumentation Limited, Tel Aviv, Israel

[22] Filed: Apr. 5, 1973

[21] Appl. No.: 348,245

[30] Foreign Application Priority Data
Apr. 17, 1972  Israel.................................. 39232

[52] U.S. Cl................................ 128/2.08, 73/239
[51] Int. Cl............................................. A61b 5/08
[58] Field of Search ............ 128/2.08, 2 C, 2.05 F; 222/57 F; 73/194 R, 2.05 L, 227, 228, 206, 211, 239, 249, 254, 419

[56] References Cited
UNITED STATES PATENTS

| | | | |
|---|---|---|---|
| 398,929 | 3/1889 | Barber.................. | 73/419 |
| 471,389 | 3/1892 | Lacey................... | 128/2.08 |
| 1,684,221 | 9/1928 | Gougnard............. | 128/2.08 |
| 1,724,567 | 8/1929 | Deren................... | 73/419 |
| 1,878,917 | 9/1932 | Turner.................. | 73/419 |
| 3,385,112 | 5/1968 | Pruitt et al............ | 73/211 |
| 3,635,214 | 1/1972 | Rand.................... | 128/2.08 |
| 3,669,097 | 6/1972 | Fitz...................... | 128/2.08 |
| 3,720,202 | 3/1973 | Cleary.................. | 128/2.08 |

Primary Examiner—Richard A. Gaudet
Assistant Examiner—Lee S. Cohen
Attorney, Agent, or Firm—A. W. Molinare

[57] ABSTRACT

An integrated flow indicator for measuring fluid quantities comprising a body having a cylindrical bore, one end of which constitutes the inlet, the other a cylinder in which a floating piston is arranged. At least one passage leads off from said bore making an acute angle with said cylinder. In the outlet of said passage a spring-loaded flap valve is disposed, and means are provided to return said piston to starting position. When fluid flows through said adaptor into said body the quantity of fluid being flowing to the said cylinder and to the said passage is divided proportionally to the cross-sectional areas of their inlet openings and the said piston will move accordingly. Any additional inflow will cause further movement of the piston which then will show the integrated flow.

5 Claims, 1 Drawing Figure

PATENTED NOV 19 1974
3,848,584
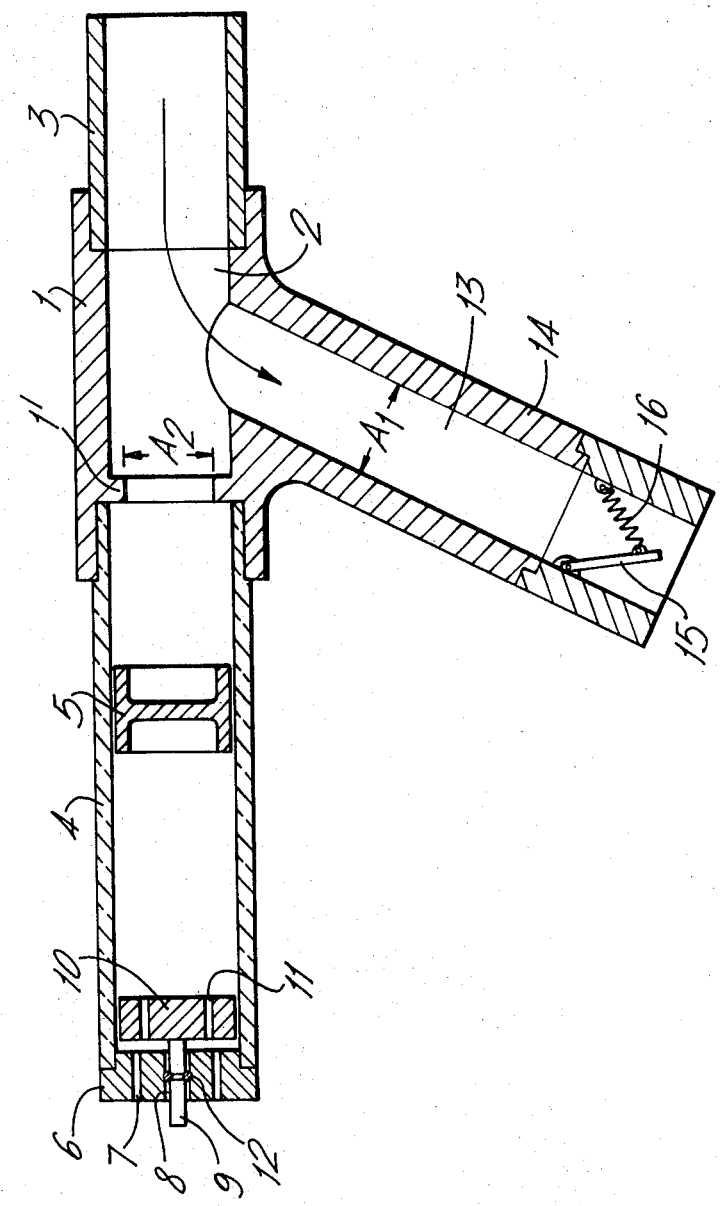

INTEGRATED FLOW INDICATOR

The present invention concerns a device for measuring fluid quantities and integrating flows to be used in, for example, testing of pulmonary functions and in particular the vital capacity of the human breath or in measurements of the flow of other fluids.

In a copending patent application there is described and claimed a respirometer comprising a cylindrical body having an intermediate section of fixed internal diameter in the walls of which section two narrow tubes extend radially and in the same diametrical plane, protruding into said section at diametrically opposite sides of the body but off-set to each other in axial directions. A supply of compressed gas is adapted to be connected to the tube which lies nearer the mouthpiece of said body, and the tube more remote from said mouthpiece is in communication with registering means such as a sensitive pressure scale or a cylinder and piston. As gas is released through said tube and when a person blows through said mouthpiece, the deviation caused to the jet by the breath can be measured in terms of the pressure of the gas jet in said opposite tube.

It is the object of the present invention to provide a simple device which measures only the integrated flows or quantities, rather than the flows and speeds.

The invention consists in an integrated flow indicator for measuring fluid quantities comprising a body having a cylindrical bore, one end constituting the entrance adaptor and mouthpiece, the other a cylinder in which a floating piston is arranged, at least one passage leading off from said bore at an acute angle thereto in the direction of said cylinder, a spring-loaded flap valve being provided in the outlet of said passage, means being provided to return said piston to starting position.

In one preferred embodiment of the invention the said passage is provided in an integral part of the body which part constitutes a handle for holding the device, a flap of a shape to correspond to the cross-section of said passage being hingedly mounted therein and being adapted to open the outlet of the passage against the action of a spring.

In another preferred embodiment of the invention said passage is constituted by inclined apertures provided in the wall of the said body, a flap of a shape to correspond to the cross-section of the outlet from said apertures being hingedly mounted therein and being adapted to open them against the action of the spring.

The floating piston may be returned to its starting position by gravity. However, according to a further preferred embodiment of the invention return means of said floating piston to its starting position comprise a reset piston having an operating rod extending through the cover of the free end of the cylinder.

The invention is illustrated, by way of example only, in the accompanying drawing showing one embodiment of the integrated flow indicator according to the invention in vertical section.

A body 1 having a substantially cylindrical bore 2 carries at one end a cylindrical entrance adaptor 3 and at the other a cylindrical sleeve 4 in which a piston 5 is floating freely. The adapter 3 and cylinder 4 may be held in body 1 by screwing, by friction or in any other suitable manner, or if desired, they may be made in one piece with body 1.

Cylinder 4 is closed by a cover 6 having exhaust ports 7 and a control aperture 8 through which the operating rod 9 of a reset piston 10 extends, said reset piston having ports 11 similar to those of the cover 6. An annular spring catch 12, known per se, lodged in cover 6 engages in a restriction of rod 9 to keep the reset piston 10 in inoperative position.

The bore 2 of body 1 communicates with a passage 13 extending at one acute angle to the axis of the body in the direction of the cylinder 4 and being provided in a handle 14 integral with the body 1. The passage 13 is covered by a flap 15 of the same cross-section and hingedly attached to the handle 14, a spring 16 of predetermined force being provided to prevent the opening of said flap. The latter and its spring may be provided as shown in a separate handle part attached to the main handle if desired.

An internal shoulder 1' within body 1 at the inner end of the cylinder 4 limits the movement of the floating piston 5.

The cylinder 4 is made transparent or translucent so that the movement of the piston can be easily seen from the outside. A calibration made on the cylinder in units of volume, e.g. liters, will permit a quick reading of the required information.

The device works as follows:

The fluid flowing into adaptor 3 is directed into two paths: the main flow is through passage 13, while smaller quantities of the fluid flow to cylinder 4, moving piston 5. Given equal resistance to flow in both paths, the flow will be divided into quantities in proportions depending on the ratios of the areas $A_1$, $A_2$. Thus, a certain and fixed percentage of the inflow volume is diverted to the cylinder and causes piston 5 to move according to said volume. Any additional inflow will cause further movement of the piston 5, to show the integrated flow.

To effect the equality of resistances to the flow in the two passages, the compensating valve 15 is built in the instrument. In larger flows, said valve opens more and prevents excessive increases in the pressure.

If desired, instead of passage 13 and handle 14, inclined apertures can be provided in the wall of the body and flaps, having the same cross-section as said apertures, may be hingedly mounted therein.

The piston 5 may be returned to starting postion by gravity, i.e., it may just be tilted until the cylinder extends vertically so that the piston falls down until stopped by shoulder 1'. However, the reset piston 10 is provided as has been described hereinabove for returning the piston to starting position. If desired, other means, e.g. a plunger or magnetic means may be provided to reset piston 5.

I claim:

1. An improved integrated flow indicator adapted for measuring the capacity of human breath comprising: a body having a cylindrical bore including a first and second ends; an entrance adapter and mouthpiece formed adjacent to the first end of the cylindrical bore and communicating therewith; a floating piston disposed in the cylindrical bore adjacent to the first end of the cylindrical bore and slidable in the cylindrical bore between a first position adjacent to the first end of the cylindrical bore and a second position adjacent to the second end of the cylindrical bore; at least one passage in the body leading off from the cylindrical bore between the first end of the cylindrical bore and the first position of the piston and having an outlet valve means disposed in the passage adjacent to the outlet of the passage; spring means biasing the valve means to a passage closed position, with the biasing force exerted by the spring means such as to assure that a linear relationship is maintained between the velocity of flow and quantity of air flowing through indicator; and means for returning the piston to its first position after usage of the indicator.

2. The integrated flow indicator as claimed in claim 1 wherein a cylindrical member, separable from but normally attached to the body, defines the portion of the cylindrical bore between the first position of piston and the second end of the cylindrical bore; and wherein the entrance adapter and mouthpiece is separable from but normally attached to the body adjacent to the first end of the cylindrical bore.

3. The integrated flow indicator as claimed in claim 2, wherein the cylindrical member is made of transparent material having calibrations on its exterior.

4. The integrated flow indicator as claimed in claim 1, wherein the passage is provided in an integral part of the body, which part is designed to be used as a handle for holding the device; wherein the valve means includes a flap which has a shape to correspond to the cross-section of the passage which is hingedly mounted in the passage adjacent to the outlet and which is adapted to open in the passage against the bias of the spring means.

5. The integrated flow indicator as claimed in claim 1, wherein a cover closes the second end of the cylindrical bore; wherein exhaust port means is disposed in the cover and permits restricted escape of air from the cylindrical bore; and wherein the return means comprises a reset piston having an operating rod which is held by a spring catch and which extends through the cover.

* * * * *